United States Patent [19]

Bernardi

[11] Patent Number: 4,606,261
[45] Date of Patent: Aug. 19, 1986

[54] GRIDIRON FOR GRILLING FOOD ITEMS BY REFLECTED HEAT

[76] Inventor: Dario Bernardi, Via Giuseppe Mazzini 5, Cattolica, Italy

[21] Appl. No.: 675,364

[22] Filed: Nov. 27, 1984

[30] Foreign Application Priority Data

Nov. 30, 1983 [IT] Italy .............................. 44035 A/83

[51] Int. Cl.⁴ ............................................ A47J 37/00
[52] U.S. Cl. ......................................... 99/445; 99/446
[58] Field of Search ................. 99/444, 445, 446, 425; 126/41 R

[56] References Cited

U.S. PATENT DOCUMENTS 1,057,449  4/1913  Noreck .................................. 99/446
1,510,547  10/1924 Ferrari .................................. 99/445
3,186,331  6/1965  Dettling ........................... 99/446 X

FOREIGN PATENT DOCUMENTS 717320  1/1932  France ................................. 99/445

Primary Examiner—Billy J. Wilhite
Attorney, Agent, or Firm—Guido Modiano; Albert Josif

[57] ABSTRACT

The gridiron comprises a frame, a plurality of parallel slats having their opposite ends rigidly attached to said frame and defining of the grilling surface, said slats comprising an inclined flat portion, a first longitudinal lip bent downwards from the top edge of said inclined portion and forming a roof panel, a second longitudinal lip bent upwards from the bottom edge of said inclined portion and forming a gutter, the first and second longitudinal lips of adjacent slats at least partly overlapping each other.

1 Claim, 4 Drawing Figures

U.S. Patent  Aug. 19, 1986  4,606,261
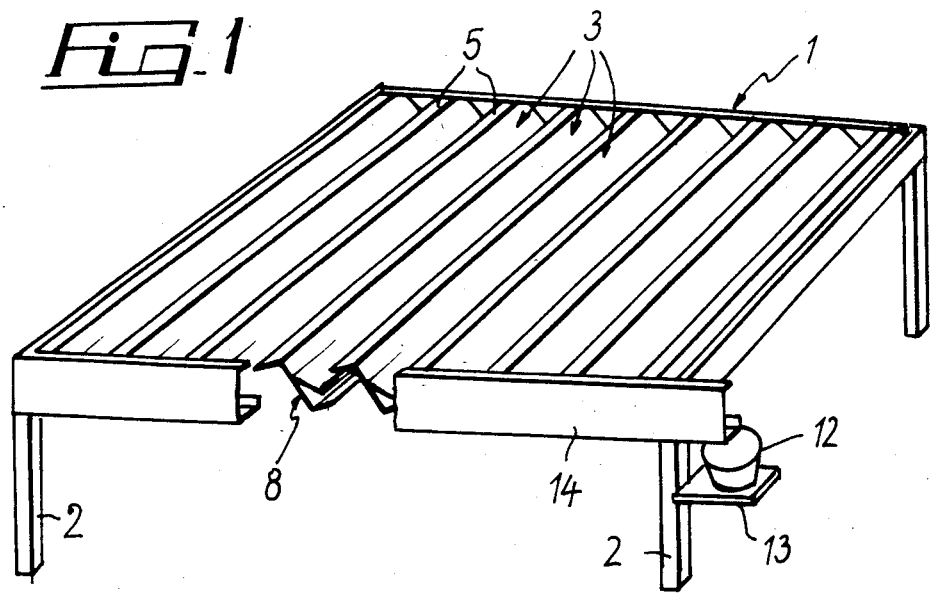
Fig. 1
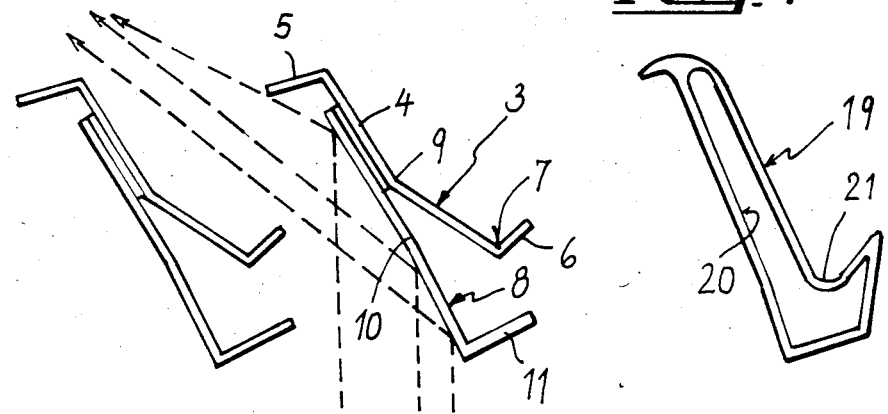
Fig. 2
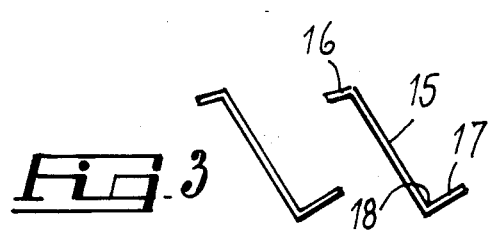
Fig. 3
Fig. 4

GRIDIRON FOR GRILLING FOOD ITEMS BY REFLECTED HEAT

BACKGROUND OF THE INVENTION

This invention relates to a gridiron for grilling food items by reflected heat.

Gridirons currently in use for grilling food items consist of metal rods extending parallel and being joined to one another by end crosspieces.

With such gridirons, the problem is encountered that liquified food fat, and any oil poured onto the food itself, are allowed to drip down onto the heat source and ignite, thus causing the food item to be burned.

A similar situation is met where the heat source produces flames which sweep the food item directly.

SUMMARY OF THE INVENTION

It is an object of this invention to obviate such shortcomings.

This object is achieved by providing a gridiron which comprises a frame and a plurality of parallel slats having their opposed ends rigidly attached to said frame and defining the grilling surface, said slats having an inclined flat portion, a first longitudinal lip bent downwards from the top edge of said inclined portion and forming a roof panel, a second longitudinal lip bent upwards from the bottom edge of said inclined portion and forming a gutter, the top and bottom lips of adjacent slats at least partly overlapping each other.

BRIEF DESCRIPTION OF THE DRAWING

Further features of the invention will be apparent from the following description with reference to the accompanying drawing, where:

FIG. 1 is a perspective view of a gridiron according to this invention;

FIG. 2 is a sectional view through the slats forming the gridiron of FIG. 1; and FIGS. 3 and 4 are sectional views through slats of different configurations as used in this gridiron.

DESCRIPTION OF THE PREFERRED EMBODIMENTS

With reference to FIGS. 1 and 2, this gridiron comprises a frame 1 of rectangular shape which is adapted to rest upon a surface through four feet 2. Between two opposite sides of the frame 1 there extend a plurality of metal slats 3 extending parallel to one another and forming the gridiron grilling surface.

Each slat includes an inclined flat portion 4, of which the top and bottom edges are bent downwards and upwards, respectively. Thus, first and second longitudinal lips 5 and 6 respectively are formed.

The first longitudinal lip 5 forms, in cooperation with the flat portion 4, a roof panel, and the second longitudinal lip 6 defines, again with said flat portion 4, a gutter 7 for collecting the liquified food fats and oil produced by the grilling process.

Joined to the bottom face of the inclined flat portion 4 is a metal angle member 8 which partially envelops the gutter 7 at the bottom. The connection may be accomplished by riveting with the interposition of spacer washers to keep the portion 4 raised from the sectional member 8 and decrease heat transfer. Expediently, the inclined flat portion 4 has a longitudinal middle fold 9 which allows the flanges 10 and 11 of the angle member 8 to stand away from the bottom section of the portion 4 and from the second lip 6.

The slats 3 are placed at such a mutual distance apart as to have the first lip 5 of one slat 3 overlap the second lip 6 of an adjacent slat 3.

To drain off the oil and liquified food fats produced by grilling into a collecting vessel 12, the vessel is positioned at one foot of the frame 1 and the grilling surface is arranged to slope downwardly towards said foot.

In the embodiment shown, the vessel 12 is supported on a bracket 13 made rigid with one frame foot, and oil and liquified food fats are conveyed thereinto through a trough 14 formed along one side of the frame 1, into which there converge the gutters 7 of the slats 3. As may be seen from FIG. 2, the angle member 8 serves the dual function of reflecting heat toward the food item(s) being grilled, and of preventing direct exposure of the gutter 7 to the heat source, thus preventing overheating thereof and ignition of the oil being conveyed therethrough. Further, the overlapping first and second lips 5,6 effectively prevent the heat source from coming in direct contact with the food item(s) and causing superficial burning thereof.

To provide for uniform cooking of the food items, it is contemplated that the heat source for grilling be laid in a parallel plane to the grilling plane, and accordingly, likewise sloping downwards towards the foot of the frame 1 whereat the collecting vessel 12 is provided.

For the gridiron construction, it would also be possible to use slats of simplified cross-section, as shown in FIG. 3, of which the inclined portion is indicated at 15, and the top and bottom lips at 16 and 17, respectively. In this case, the gutter 18 would not be screened off. It may be appreciated that such slats would be used where the heat source has such a temperature level as to constitute no risk of igniting the oil collected in the gutter 18.

Finally, in the embodiment of FIG. 4, it is contemplated that a protective screen may be formed by using slats 19 of tubular cross-section.

I claim:

1. A gridiron for grilling food items by reflected heat, comprising a frame, a plurality of parallel slats having opposite ends rigidly attached to said frame and forming a grilling surface, each slat including an inclined flat portion defining a top edge and a bottom edge, said flat portion being formed with a first longitudinal lip, said first longitudinal lip being bent downwards from said top edge of said flat portion and forming a roof panel, said flat portion being further formed with a second longitudinal lip, said second longitudinal lip being bent upwards from said bottom edge of said flat portion and forming a gutter, said top and bottom edges of adjacent slats in said plurality of parallel slats at least partly overlapping each other, wherein said gutter has a bottom surface and said flat portion is formed with a longitudinal fold, and said gridiron further comprises an angle member, said angle member being made rigid with said flat portion of said slats, said angle member partially enveloping said bottom surface of said gutter, a bottom portion of said angle member and a bottom portion of said slat diverging from each other at said longitudinal fold.

* * * * *